June 10, 1947.  S. R. DAVIS  2,421,928
MOLD AND METHOD OF MOLDING
Filed Oct. 5, 1944

INVENTOR.
Samuel R. Davis
BY
Norman H. Holland
ATTORNEY

Patented June 10, 1947

2,421,928

UNITED STATES PATENT OFFICE 2,421,928

MOLD AND METHOD OF MOLDING

Samuel R. Davis, Federalsburg, Md., assignor to Maryland Plastics, Inc., Federalsburg, Md., a corporation of Maryland Application October 5, 1944, Serial No. 557,323

10 Claims. (Cl. 18—42)

The present invention relates to the molding art and more particularly to molding from synthetic resins, articles such as buttons, having one or more apertures therein.

Buttons and similar articles are molded in large quantities and hence reduction in the time or labor required represents a substantial saving. In addition the holes in the buttons should be smooth and free from rough edges to prevent wear on the thread used to hold the buttons in place on wearing apparel. In the manufacture of buttons the holes may be formed during the molding operation or drilled after molding. The former is less expensive but it is difficult to avoid rough surfaces which will cause undue wear on thread passed through the holes. A further difficulty is encountered in removing the buttons from the mold pins used for forming holes. The use of ejectors for this purpose increases the cost of the molding operation, reduces the number of buttons which can be made in a given size mold since there has to be room for the ejectors and their operating mechanism, and increases the time required for each molding operation.

The present invention aims to minimize or overcome the above difficulties by a method and mold in which the rough portions on the button holes are reduced to a minimum and located where they may be removed by tumbling. The invention also aims to simplify the molds and molding operations by eliminating the necessity for ejectors and similar devices for removing the buttons from one of the mold sections. These aims are achieved in a simple and inexpensive manner.

An object of the present invention is to provide an improved mold and method for molding articles such as buttons, having apertures therein.

Another object of the invention is to reduce the cost of manufacturing articles such as buttons.

Another object of the invention is to minimize or eliminate in a simple and inexpensive manner rough surfaces about the holes in the buttons.

Another object of the invention is to simplify the molding equipment for molding articles such as buttons having holes therein.

Another object of the invention is to simplify the removal of articles such as buttons from the pins forming the holes.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a fragmentary side elevational view partly in section of a mold for forming buttons and the like;

Figure 1:
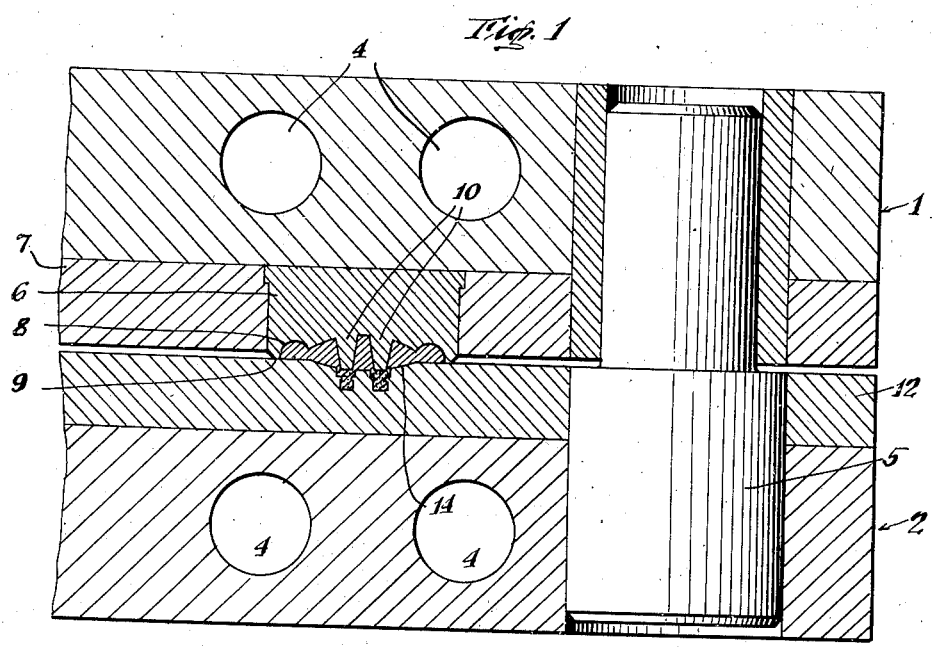

Referring again to the drawings illustrating a preferred embodiment of the invention and one way of performing the method, there is shown in Fig. 1 a mold for forming articles such as buttons having an upper section 1 and a lower section 2. These sections may have holes or ducts 4 through which steam may be passed to heat the molds to the desired temperature. Suitable dowel pins 5 may be utilized for registering the mold parts accurately during the molding operation. Suitable cavities may be provided in the molds for molding the articles. The mechanism, usually a hydraulic press, for operating the mold sections is not a part of the invention and is not described herein.

As illustrated in the drawings, a series of individual molds 6 are fitted in recesses in a plate 7 on the upper mold section 1 for forming one side of each button. The lower side of each individual mold 6 has a cavity 8 therein to form the face of the button and also has an outer periphery 9 which engages and rests upon the lower mold section 2. The cavities 6 also have pins 10 for forming the holes in the buttons. These pins are slightly longer than the depth of the article to be molded to fit into recesses in the lower mold section as will be described later.

Figures 2, 4:
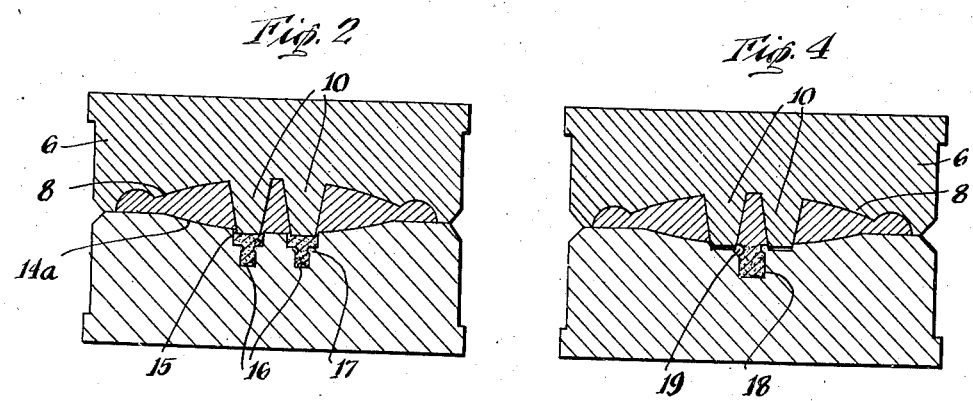
Fig. 2 is an enlarged view partly in section of one cavity of the mold, with the lower part differing from the construction shown in Fig. 1.
Fig. 4 is a sectional view of a cavity illustrating another embodiment of the invention.

The lower mold section 2 may have a plate 12 thereon with cavities 14 in the upper surface thereof registering with the cavities 6 for forming buttons. If desired, the plate 12 may have individual molds similar to the molds 6 in the upper mold section with a cavity 14 formed in each of them. Such a construction is illustrated in Fig. 2 where the lower cavity 14a is formed on a separate part corresponding to the individual molds 6 in the upper section. The plate 12 and the recesses 14 therein form the lower surface of the buttons.

Figure 3:
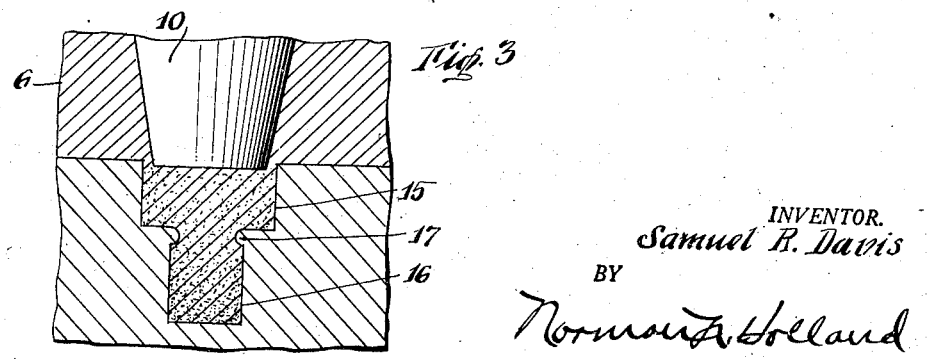
Fig. 3 is a fragmentary enlarged sectional view of the portion of the cavity about the end of a molding pin.

Referring more particularly to Figs. 2 and 3, it will be noted that recesses 15 are formed to register with the lower ends of the pins 10 and are adapted to receive the ends of the pins. Preferably spaces between the sides of the pins adjacent the ends thereof and the adjoining walls of the recesses are small but sufficiently large to permit molding material to be forced therein and to be cured or partly cured therein during the molding operation. This cured portion attaches itself to the material within the recess 15. In the preferred embodiment the bottom of the recess 15 has a sub-recess 16 drilled or otherwise formed therein with an undercut 17 at the junction of the sub-recess 16 with the main recess 15. This undercut may be formed by peening the edge of the shoulder between the two recesses or in any other suitable manner.

While there is no intention of limiting the invention to the dimensions of the recess and sub-recess, it has been found that a sub-recess three hundredths of an inch in diameter and one-eighth of an inch in depth is satisfactory. The dimensions will vary with the size of the buttons and with the size of the holes therein. Any desired depth may be utilized. Likewise the clearances between the sides of the pin and the sides of the recess may vary but the formation of a thin side wall has been found to be satisfactory and sufficiently strong to anchor the button and at the same time break when the button is removed.

The recess 15 and the sub-recess 16 fill with molding material and serve as a landing for the molding pins. The undercut 17 prevents the molding material from being pulled out by the button as the button is removed from the mold part. As a matter of fact, this portion anchors each button in the lower mold section so that the upper mold section and the pins may be removed from the buttons without the buttons adhering to the upper part. An examination of the mold parts in Fig. 2 will demonstrate the difficulty which would be encountered in removing the buttons if they should adhere to the upper mold part. Heretofore the general practice has been to provide ejector pins which would force the buttons out of the upper section and off the pins. Such ejector mechanisms increase the cost of the mold and mold parts and in addition take up space which could otherwise be used for additional button cavities to increase the capacity of the mold.

When the mold parts are separated the buttons remain in the lower section and may be scraped or blown off very quickly. Since the shell molded about one end of each of the button holes is anchored to the lower mold section by means of the recesses 15 and 16 and the undercut 17, these parts remain in the mold when the buttons are scraped or blown off the section, thus automatically removing the shells formed about the lower ends of the button holes. This eliminates punching operations for removing the shell, in addition it minimizes any rough surface at the edges of the holes by breaking off the shells just above the surface of the button around the hole so that any roughness lies above the nearly flat button surface. This makes it possible to finish the buttons by a tumbling operation which is inexpensive and at the same time effective in removing the accessible rough surfaces at the edges of the button holes. Since the molding material remains in the anchoring recesses no extra material is required in molding the buttons as the material in the recesses 15 and 16 is used over and over again.

Another embodiment of the invention is illustrated in Fig. 4 of the drawings wherein a recess 18 is formed in the lower mold section with a reduced opening or undercut 19 located at the portion of the button intermediate the mold pins 10. The recess 18 operates in the manner described above with reference to recess 15 and sub-recess 16. Solidified material remains in the recess and is held in by the reduced opening at 19. This solidified material adheres to the surface of the button during the molding operation and holds the button in position when the molds are separated. When the button is removed from the mold the part within the recess 18 is retained therein leaving merely a rough surface on the button which may be removed by tumbling. In this embodiment the recess is shown registering with the portion of the button intermediate the holes therein. It will be understood that certain advantages may be obtained by a similar recess located in other positions with respect to the button.

In the operation of the mold the usual tablets or pills are placed within the respective mold cavities 14, the mold parts are brought together and are maintained at a sufficient temperature by means of steam passed through ducts 4. If desired the mold parts may be stopped while in contact with the tablets to heat them to a substantially plastic state prior to forcing the pins 10 through them. The ends of the pins 10 land on the surplus material retained in recesses 15 and 16 in previous molding operations. A small amount of the new molding material is forced into the clearance between the sides of the pins and the upper edges or sides of the recesses 15. This molding material flows and adheres to the inert molding material within the recesses 15 and sub-recesses 16. After a suitable period the molding material becomes cured and the mold parts are separated. Since the material in the recesses 15 and 16 is held therein by the undercut 17 or by other suitable means, the buttons are anchored on the lower section permitting the upper section and the pins thereon to be removed from the buttons. The annular shell connecting each button to the material in the recess therefor is sufficient to hold the buttons in position. Thereafter the buttons may be scraped or blown off the lower section of the mold and the mold prepared for a new charge of tablets or pills.

It will be seen that the present invention provides a simple and effective mold and method for making plastic articles such as buttons or similar articles having apertures therein. The necessity for an ejector mechanism is eliminated without increasing the amount of material required in molding the articles. The capacity of the mold is increased by utilizing the space, which would otherwise be required for ejectors, to provide additional mold cavities. In addition the molding period may be reduced which further increases the productive capacity of the equipment. The mold comprises a minimum of parts which are rigid in construction and unlikely to require repairs. The recesses with the undercut portions for anchoring the buttons in position provide a simple and effective means for retaining the buttons on the lower mold part where they can be readily removed.

As various changes may be made in the form, construction and arrangement of the parts herein without departing from the spirit and scope of the invention and without sacrificing any of its advantages, it is to be understood that all

Having thus described my invention, I claim:

1. The method of molding articles in a sectional mold which method comprises molding on the article in the closed mold sections, a part projecting above the surface and not desired on the finished article, anchoring said undesired part to one of the mold sections, utilizing said anchored part to retain the article on the section to which it is anchored when the sections are opened, removing the article from the section without removing the anchored part by breaking the article from the anchored part, and removing by tumbling the projecting roughness.

2. In a mold for molding articles such as buttons having an aperture therein, the combination of a mold part for forming one side of the button and including a pin for forming an aperture in the button, a single mold part for forming the other side of the button, said single part having a recess in the line of travel of the pin adapted to receive material forced into it by the pin, said recess having a reduced neck portion above the bottom thereof to prevent removal of the material forced beyond the neck portion thereby to anchor the article on said mold part when the mold parts are separated.

3. In a mold for forming molded articles such as buttons, having an aperture therein, the combination of a mold part for forming one side of the button having a pin thereon for forming an aperture in the button, a second mold part formed in one piece for forming the other side of the button, said second mold part having a recess in the line of travel of the pin to form a shell about the end of the pin and about the end of the button aperture, said recess having a restricted portion above the bottom thereof for locking said shell in said recess to hold the button on said mold part when the mold parts are separated.

4. In a mold for molding articles such as buttons, having an aperture therein, the combination of a one piece mold part for forming one side of the button and having a pin for forming an aperture in the button, a second one piece mold part for forming the other side of the button, said second mold part having a recess in the line of travel of the pin, the open end of said recess being slightly larger than the end of the pin to permit the end of the pin to be telescoped therein, said recess having a restricted portion above the bottom thereof to anchor the button on said mold part during the separation of the mold parts.

5. In a mold for molding articles such as buttons having one or more apertures therein, the combination of a mold part for forming one side of a button and having pins for forming the apertures in the button, a second mold part for forming the other side of the button, said second part having recesses in the line of travel of the respective pins adapted to extend about the adjacent ends of the pins, when the pins are forced through the molding material, a sub-recess in the bottom of each said first recesses having a reduced opening to anchor a button in position.

6. In a mold for molding articles such as buttons, having one or more apertures therein, the combination of a mold part for forming one side of the buttons and pins for forming the apertures in the buttons, a second mold part for forming the other side of the button, said second mold part having a recess located on the surface intermediate holes on one side of the button, said recess having a reduced opening to receive material during the molding operation and to anchor the button in said section of the mold when the mold parts are separated.

7. The method of molding from plastic material articles such as buttons having one or more holes therein, which method includes molding the articles out of the material in a mold retaining surplus molding material from a previous molding operation, driving a pin through the material to form a hole and to carry material against the surplus material retained from a previous molding, and removing the molded button by breaking off the mold button so as to leave surplus material in the mold to retain the next button.

8. The method of molding from plastic material articles such as buttons having one or more holes therein, which method includes molding the article out of the material in a mold retaining surplus molding material from a previous molding operation, driving a pin through the material to form a hole and to carry material against the surplus material retained from a previous molding, and removing the molded buttons by a force applied edgewise to them.

9. The method of molding articles in a sectional mold which method comprises molding on the article in the closed mold sections, a part projecting above the surface and not desired on the finished article, anchoring said undesired part to one of the mold sections, utilizing said anchored part to retain the article on the section to which it is anchored when the sections are opened, and removing the article from the section without removing the anchored part by breaking the article from the anchored part.

10. The method of molding articles such as buttons having apertures therein in a sectional mold which comprises molding on the article in the closed mold sections, a part projecting above the surface and about the end of the aperture, said part not being desired on the finished article, anchoring said undesired part to one of the mold sections, utilizing said anchored part to retain the article on the section to which it is anchored when the sections are opened, and removing the article from the section without removing the anchored part by breaking the article from the anchored part.

SAMUEL R. DAVIS.

REFERENCES CITED

The following references are of record in the file of this patent:

UNITED STATES PATENTS

| Number | Name | Date |
| --- | --- | --- |
| 2,186,160 | Anderson | Jan. 9, 1940 |
| 2,217,661 | Anderson | Oct. 15, 1940 |
| 168,863 | Atterbury | Oct. 19, 1875 |
| 313,399 | Atterbury | Mar. 3, 1885 |
| 2,087,470 | Davidson et al. | July 20, 1937 |
| 2,084,427 | Broderson | June 22, 1937 |
| 2,133,906 | Scott, Jr. | Oct. 18, 1938 |
| 2,371,061 | Milano | Mar. 6, 1945 |